(12) United States Patent
Norisue et al.

(10) Patent No.: US 6,730,371 B2
(45) Date of Patent: May 4, 2004

(54) OPTICALLY ACTIVE COMPOUND AND LIQUID CRYSTAL COMPOSITION CONTAINING THE COMPOUND

(75) Inventors: Yasumasa Norisue, Tokyo (JP); Takakiyo Mine, Tokyo (JP); Masahiro Johno, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 48 days.

(21) Appl. No.: 10/118,431

(22) Filed: Apr. 9, 2002

(65) Prior Publication Data

US 2003/0054119 A1 Mar. 20, 2003

(30) Foreign Application Priority Data

Apr. 13, 2001 (JP) ......................... 2001-115602
Apr. 25, 2001 (JP) ......................... 2001-126990

(51) Int. Cl.$^7$ .................. C09K 19/12; C09K 19/30; C09K 19/20; C07C 69/76; C07C 25/13
(52) U.S. Cl. ............. 428/1.1; 252/299.63; 252/299.62; 252/299.64; 252/299.65; 252/299.67; 560/56; 560/65; 560/85; 560/100; 570/129
(58) Field of Search .................. 252/299.63, 299.61, 252/299.62, 299.64, 299.65, 299.67; 560/56, 65, 85, 100; 570/129; 428/1.1

(56) References Cited

U.S. PATENT DOCUMENTS

| 3,977,769 A | 8/1976 | Tsukamoto et al. |
| 4,968,820 A | 11/1990 | Scherowsky |
| 6,217,792 B1 | 4/2001 | Parri |
| 6,372,308 B1 * | 4/2002 | Yoshioka et al. ............. 428/1.1 |

FOREIGN PATENT DOCUMENTS

| EP | 0-211646 A2 | 2/1987 |
| EP | 233602 | 8/1987 |
| EP | 0-309774 A2 | 4/1989 |

(List continued on next page.)

OTHER PUBLICATIONS

Nakauchi et al., Ferroelectric Liquid Crystal Mixtures Doped With Compounds Having Chiral Groups At Both Ends Of The Core, 362 Japanese Journal Of Applied Physics/Part2, 28 (1989) Feb., No., Tokyo, JP.

*Primary Examiner*—Shean C. Wu
(74) *Attorney, Agent, or Firm*—Sherman & Shalloway

(57) ABSTRACT

An optically active compound of the following general formula (1) useful as a chiral dopant, and use thereof, (1)

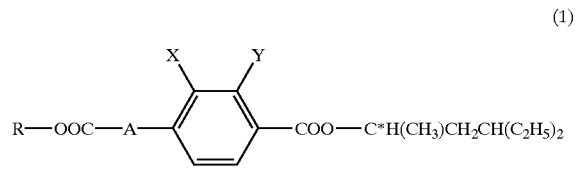

wherein each of X and Y is independently a hydrogen atom or a fluorine atom, R is $(C_2H_5)_2CHCH_2C^*H(CH_3)-$ or $Ph-C^*H(CH_3)-$, A is $-Ph(W)-COO-Ph-$, $-Ph-Ph-COO-$, $-Cy-COO-Ph-$, $-Ph(W)-OOC-Ph-COO-$, $-Ph(W)-OOC-Cy-COO-$, $-Ph(W)-OOC-Np-COO-$ or $-Np-OOC-$, in which $Ph-$ is a phenyl group, $-Ph-$ is a 1,4-phenylene group, $-Ph(W)-$ is $-Ph-$ or monofluoro substituted $-Ph-$, $Cy-$ is a trans-1,4-cyclohexylene group and $-Np-$ is a 2,6-naphthylene group, and C* is an asymmetric carbon.

The optically active compound of the present invention has a large helical twisting power (HTP) of at least 14 and suitably has the property that its induced helical pitch decreases in length with an increase in temperature, so that it has an excellent value as a chiral dopant for a nematic liquid crystal composition.

11 Claims, 1 Drawing Sheet

FOREIGN PATENT DOCUMENTS

| | | |
|---|---|---|
| EP | 0-329153 A2 | 8/1989 |
| EP | 0-405346 A2 | 1/1991 |
| EP | 0-449049 A2 | 10/1991 |
| EP | 0-517504 A1 | 12/1992 |
| EP | 0-528268 A2 | 2/1993 |
| EP | 0-937765 A1 | 8/1999 |
| EP | 0-994-097 A2 | 4/2000 |
| EP | 1225212 * | 7/2002 |
| JP | 62-195347 | 8/1987 |
| JP | 2-53768 | 2/1990 |
| JP | A-9-26572 | 1/1997 |

* cited by examiner

F I G. 1
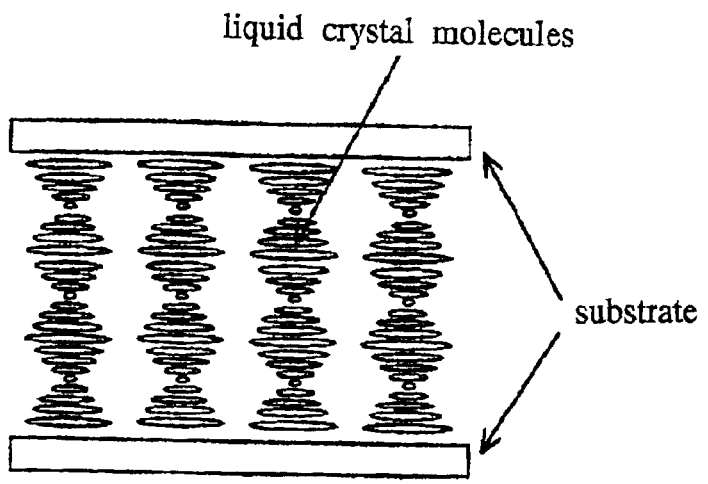
F I G. 2
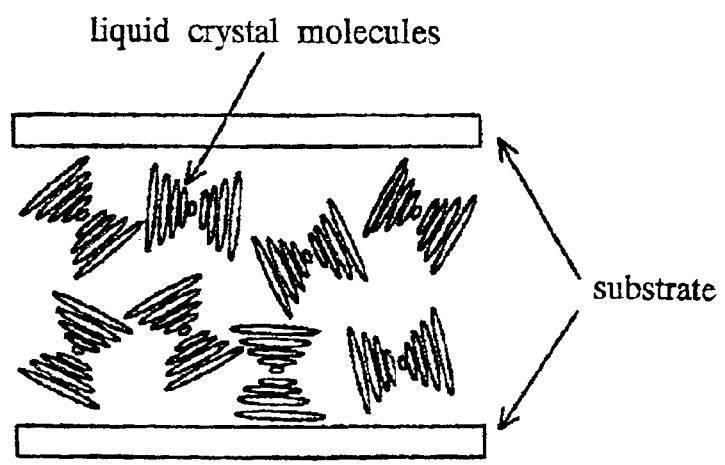

OPTICALLY ACTIVE COMPOUND AND LIQUID CRYSTAL COMPOSITION CONTAINING THE COMPOUND

DETAILED DESCRIPTION OF THE INVENTION

1. Field of Industrial Utilization

The present invention relates to a novel optically active compound useful as a chiral dopant, a liquid crystal composition containing the compound and a liquid crystal display device to which the liquid crystal composition is applied. More specifically, it relates to a chiral dopant having a helical twisting power (HTP) of at least 14 and having the property that a helical pitch induced decreases with an increase in temperature, and use thereof.

2. Prior Art

Various modes are known as display modes of liquid crystal display devices, and in most of such display modes, it is required to control the helical pitch of a liquid crystal. The mode that requires control of the helical pitch of a liquid crystal includes the following modes.

The modes that have been put to practical use and widely employed are a twisted nematic mode (TN mode) and a super twisted nematic mode (STN mode) using a nematic liquid crystal.

In the TN mode, liquid crystal molecules are aligned so as to twist at 90 degrees between an upper substrate and a lower substrate, and a ¼ pitch of a helix is formed in a cell.

In the STN mode, liquid crystal molecules are aligned so as to twist at approximately 220 degrees between an upper substrate and a lower substrate, and an approximately ⅗ pitch of a helix is formed in a cell.

The TN mode is employed in a simple matrix driving liquid crystal display device and an active matrix driving liquid crystal display device, and the STN mode is employed in a simple matrix driving liquid crystal display device.

BRIEF DESCRIPTION OF DRAWINGS

FIG. 1 schematically shows a planar alignment of a chiral nematic liquid crystal.

FIG. 2 schematically shows a focal-conic alignment of a chiral nematic liquid crystal.

As another mode in addition to the above TN mode and STN mode, there is a selective reflection (SR) mode of a chiral nematic liquid crystal. As shown in FIGS. 1 and 2, in the SR mode, a liquid crystal has a planar molecule alignment state (FIG. 1) in which helical axes are perpendicular to substrates and a focal-conic molecule alignment state (FIG. 2) in which directions of helical axes are at random. These two states are switched with voltage pulse. In the planar molecule alignment state, light having a wavelength corresponding to a helical pitch is reflected, and in the focal-conic molecule alignment state, light is transmitted through a device. When a reflection state is used as "bright" and when a transmission state is used as "dark", a display is made possible.

In the present specification, "nematic liquid crystal" refers to a nematic liquid crystal that does not contain the chiral dopant of the present invention. Further, "liquid crystal composition" or "nematic liquid crystal composition" refers to a nematic liquid crystal composition containing the chiral dopant of the present invention. Further, "liquid crystal" refers to a composition containing a mixture of a plurality of liquid crystal compounds unless it is specified to be any specific compound, and the "liquid crystal" will be sometimes referred to as "base liquid crystal". Further, "chiral dopant" refers to an optically active compound that induces a helical structure or a mixture of such compounds.

As is already described, an optically active compound that induces a helical structure is generally called "chiral dopant". Many chiral dopants have been synthesized, and typical compounds thereof are compounds having the following structures.

Name Structural Formula

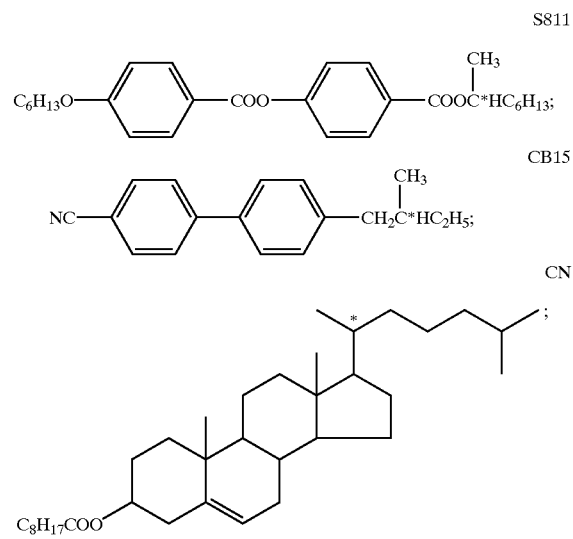

The most essential performance that is required of a chiral dopant compound is to have large helical twisting power. The helical twisting power (HTP) refers to a physical quantity defined by the following expression.

HTP ($\mu m^{-1}$)=1/(amount of chiral dopant added (wt %)/100×induced helical pitch ($\mu m$))

Generally, chiral dopants themselves exhibit no liquid crystallinity, and most of them have large molecular weights. When a large amount of a chiral dopant is added to a base liquid crystal, it degrades various performances in many cases. The degradation of the performances includes a decrease in temperature for phase transition from an isotropic phase to a nematic phase, an increase in viscosity of a liquid crystal and an easy occurrence of crystallization. A chiral dopant having large helical twisting power serves to prevent the degradation of the performances since a desired helical pitch can be obtained by adding a small amount of such a chiral dopant to the base liquid crystal.

In addition to the above problems, the SR mode further has a problem that the helical pitch depends upon temperatures. That is, in the SR mode, a liquid crystal reflects (selectively reflects) light corresponding to a helical pitch to produce a bright state. However, when chiral dopants that have been already developed are used, the helical pitch increases in length with an increase in temperature, so that there is caused a problem that reflected light changes in color.

A change in wavelength of selectively reflected light with an increase in temperature is referred to as "wavelength shift". An increase in wavelength of selectively reflected light caused by an increase in temperature is defined to be plus wavelength shift, and a decrease in wavelength of selectively reflected light is defined to be minus wavelength shift.

For removing the dependency of wavelength of selectively reflected light upon temperatures, it has been attempted to combine a chiral dopant that shows a plus wavelength shift and a chiral dopant that shows a minus wavelength shift. However, there are very few chiral dopants that show a minus wavelength shift, and there are reported only four chiral dopants having a helical twisting power (HTP) of at least 9, which are disclosed in U.S. Pat. No. 6,217,792, JP-A-62-195347 and JP-A-2-053768. Those compounds that have been so far disclosed are not satisfactory, since these compounds exhibit small shift amounts and have a problem that they are liable to cause crystallization even when added in a small amount.

Problems to be Solved by the Invention

It is an object of the present invention to provide a chiral dopant that has large helical twisting power (HTP) and has a characteristic feature that the helical pitch induced decreases in length with an increase in temperature (has a minus wavelength shift).

Means to Solve the Problems

According to the present invention, there is provided an optically active compounds of the following general formula (1) useful as a chiral dopant.

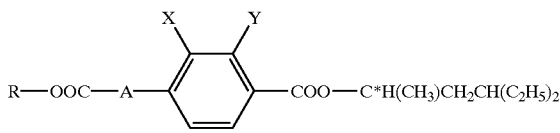

(1)

wherein each of X and Y is independently a hydrogen atom or a fluorine atom, R is $(C_2H_5)_2CHCH_2C^*H(CH_3)$— or Ph—$C^*H(CH_3)$—, A is —Ph(W)—COO—Ph—, —Ph—Ph—COO—, —Cy—COO—Ph—, —Ph(W)—OOC—Ph—COO—, —Ph(W)—OOC—Cy—COO—, —Ph(W)—OOC—Np—COO— or —Np—OOC—, in which Ph— is a phenyl group, —Ph— is a 1,4-phenylene group, —Ph(W)— is —Ph— or monofluoro substituted —Ph—, Cy— is a trans-1,4-cyclohexylene group and —Np— is a 2,6-naphthylene group, and C* is an asymmetric carbon.

The optically active compound of the above general formula (1) has excellent properties as a chiral dopant. The optically active compound of the present invention is accordingly used as an additive to nematic liquid crystals. That is, the optically active compound is used as a component for a nematic liquid crystal composition containing at least one compound thereof.

The nematic liquid crystal composition is held between substrates having electrodes and used for liquid crystal display devices.

In the above general formula (1), each of X and Y is independently a hydrogen atom or a fluorine atom, and preferably, both of X and Y are hydrogen atoms. Further, —Ph(W)— of —A— is preferably —Ph—(1,4-phenylene group), and —A— is preferably —Ph(W)—COO—Ph—. The optically active compounds of the above general formula (1) advantageously have a helical twisting power (HTP) of at least 14, and more advantageously, at least 16. And, preferably, the above optically active compounds have the property that the induced helical pitch decreases with an increase in temperature.

The optically active compounds of the present invention have two optically active carbons on left and right hand sides, one each as shown in the general formula (1). The optically active compounds therefore include four optical isomers of R—R, R—S, S—R and S—S configurations.

Of the above optical isomers, the R—R and S—S configuration isomers have excellent properties as chiral dopants. The R—R configuration isomer and the S—S configuration isomer differ from each other in twisting direction (right-twisting or left-twisting) of the helical pitch induced. When the compounds of the general formula (1) are used, compounds are therefore selected therefrom by taking account of the twisting direction of a chiral dopant to be used in combination.

Further, when a large amount of a single compound from the optically active compounds of the present invention is added to a nematic liquid crystal as a base liquid crystal, the resultant composition having some combination may undergo crystallization at room temperature. In this case, however, the crystallization can be easily avoided by using other chiral dopant in combination.

When the optically active compound(s) of the present invention is/are used as chiral dopant(s), the amount of the optically active compound(s) based on the nematic liquid crystal to which the optically active compound(s) is/are added, is generally in the range of from 1 to 30% by weight, preferably 1 to 20% by weight. The above amount ratio is determined to be in the above preferred range on the basis of values of helical twisting power (HTP) and crystallinity of the optically active compound(s) and types of a nematic liquid crystal.

Effect of the Invention

According to the present invention, there is provided a chiral dopant that has a large helical twisting power (HTP) and has the characteristic feature that the induced helical pitch decreases in length with an increase in temperature. In liquid crystals for use in TN mode or STN mode, therefore, the helical pitch can be adjusted only by adding a small amount of the chiral dopant of the present invention, so that the degradation of performances of a base liquid crystal can be suppressed. In a liquid crystal operated in SR mode, a chiral dopant that induces a plus wavelength shift and the optically active compound(s) of the present invention are used in combination, whereby there can be obtained a liquid crystal composition free of a change that occurs in helical pitch depending upon temperatures.

EXAMPLES

The present invention will be further specifically explained with reference to Examples and Comparative Examples, while the present invention naturally shall not be limited thereto.

Example 1

(Formula (1): Each of X and Y is H, A is —Ph—COO—Ph—, and R is $(C_2H_5)_2CHCH_2C^*H(CH_3)$— (E1))

Preparation of 4-((R)-3-ethyl-1-methylpentyloxycarbonyl)biphenyl-4'-((R)-3-ethyl-1-methylpentyloxycarbonyl)benzoate (1) Synthesis of 4'-acetoxybiphenyl-4-carboxylic acid 50 Grams (234 mmol) of 4'-hydroxybiphenyl-4-carboxylic acid and 238 g (2.34 mol) of acetic anhydride were placed in a reactor, and while these stirred, 0.1 g of concentrated sulfuric acid was added. The mixture was stirred until heat generation ceased, and the mixture was further heated at 80° C. for 4 hours with stirring and then gradually cooled to room temperature. While the reaction mixture was cooled in an ice bath, 500 g of water was gradually added, and the mixture was stirred at room temperature for 3 hours to quench unreacted acetic anhydride. A precipitated white solid was recovered by filtration, washed with water to remove acetic acid, and dried with a vacuum drier to give 59.8 g of an end compound (yield 99%).

(2) Synthesis of 4'-acetoxybiphenyl-4-carbonyl chloride 59.8 g (233.4 mmol) of 4'-acetoxybiphenyl-4-carboxylic acid and 278 g (2.33 mol) of purified thionyl chloride were placed in a reactor and refluxed under heat (79° C.) for 4 hours. Thionyl chloride was distilled off under atmospheric pressure, 150 ml of toluene was added, and toluene and thionyl chloride were distilled off under reduced pressure, to give 63 g of an end compound (yield498%).

(3) Synthesis of (R)-3-ethyl-1-methylpentyl-4'-acetoxybiphenyl-4-carboxylate 18.6 Grams (67.6 mmol) of 4'-acetoxybiphenyl-4-carbonyl chloride, 8.0 g (61.4 mmol) of (R)-4-ethyl-2-hexanol and 140 ml of toluene were placed in a reactor, 9.7 g (122.9 mmol) of pyridine was dropwise added thereto, and the mixture was stirred at room temperature for 3 hours. To the reaction solution was added 40 ml of water, the mixture was stirred at room temperature for 30 minutes, and a liquid of an organic layer was separated. The organic layer was washed with 2N hydrochloric acid, washed with a 1N sodium hydroxide aqueous solution and then washed with water, and the washed organic layer was dried over anhydrous sodium sulfate and filtered, and the solvent was distilled off to give 22 g of an end compound (yield 99%).

(4) Synthesis of (R)-3-ethyl-1-methylpentyl-4'-hydroxybiphenyl-4-carboxylate

22 Grams (59.7 mmol) of (R)-3-ethyl-1-methylpentyl-4'-acetoxybiphenyl-4-carboxylate and 390 ml of toluene was placed in a reactor, a solution of 40% methylamine in methanol was dropwise added thereto, and the mixture was stirred at room temperature for 3 hours. The reaction solution was washed with 2N hydrochloric acid and with water to separate the mixture into two layers of liquid, an organic layer was dried over anhydrous sodium sulfate and filtered, and the solvent was distilled off to give 19 g of an end compound (yield 97%).

(5) Synthesis of 4-((R)-3-ethyl-1-ethylpentyloxycarbonyl)biphenyl-4'-((R)-3-ethyl-1-ethylpentyloxycarbonyl)benzoate 2.0 Grams (6.12 mmol) of (R)-3-ethyl-1-methylpentyl-4'-hydroxybiphenyl-4-carboxylate, 1.8 g (8.86 mmol) of terephthaloyl dichloride and 150 ml of anhydrous dichloromethane were placed in a reactor, 3 g (37 mmol) of pyridine was dropwise added thereto, and the mixture was stirred at room temperature for 6 hours. To the reaction mixture was added 1.5 g (11.5 mmol) of (R)-4-ethyl-2-hexanol, and the mixture was stirred at room temperature for 18 hours. To the reaction solution was added 50 ml of water, the mixture was stirred at room temperature for 2 hours, and then a liquid of an organic layer was separated. The organic layer was washed with 2N hydrochloric acid, washed with a 1N sodium hydroxide aqueous solution and washed with water. The washed organic layer was dried over anhydrous sodium sulfate and filtered, and then the solvent was distilled off. The thus-obtained crude product was purified by silica gel chromatography, to give 1.2 g (2.04 mmol, yield 23%) of an end compound.

Example 2

(Formula (1): each of X and Y is H, A is —Ph—COO—Ph—, and R is Ph—C*H(CH$_3$)— (E2))

Preparation of 4-((R)-3-ethyl-1-methylpentyloxycarbonyl)biphenyl-4'-((R)-α-methylbenzyloxycarbonyl)benzoate An end compound was obtained in the same manner as in Example 1 except that (R)-4-ethyl-2-hexanol in (5) of Example 1 was replaced with (R)-1-phenylethanol (11.5 mmol).

Example 3

(Formula (1): Each of X and Y is H, A is —Cy—COO—Ph— and R is Ph—C*H(CH$_3$)— (E3))

Preparation of 4-((R)-3-ethyl-1-methylpentyloxycarbonyl)biphenyl-4'-(4-trans-((R)-α-methylbenzyloxycarbonyl)cyclohexyl)-carboxylate 12.5 Grams (12.5 mmol) of 1,4-trans-cyclohexyldicarboxylic acid, 3.1 g (15 mmol) of dicyclohexylcarbodiimide and 220 ml of dehydrated dichloromethane were placed in a reactor and stirred. Then, 1.22 g (10 mmol) of (R)-1-phenylethanol and 0.31 g (2.5 mmol) of 4-dimethylaminopyridine were added, and the mixture was stirred at room temperature for 6 hours. To this reaction mixture was added 4.9 g (15 mmol) of (R)-3-ethyl-1-methylpentyl-4'-hydroxybiphenyl-4-carboxylate that had been obtained in the same manner as in (4) of Example 1, and the mixture was stirred at room temperature for 48 hours.

To the reaction solution was added 20 ml of water, and the mixture was stirred at room temperature for 1 hour. Then, insolubles were separated by filtration, and diethyl ether was added, to separate the mixture into two organic layers of liquid. The obtained organic layer was washed with 2N hydrochloric acid, washed with a 1N sodium hydroxide aqueous solution and washed with water, and the washed organic layer was dried over anhydrous sodium sulfate and filtered. The filtrate was distilled to remove the solvent.

The thus-obtained crude product was purified by silica gel chromatography and recrystallized from hexane to give 0.62 g (1.1 mmol, yield 11%) of an end compound.

Example 4

(Formula (1): Each of X and Y is H, A is —Ph—Ph—COO— and R is (C$_2$H$_5$)$_2$CHCH$_2$C*H(CH$_3$)— (E4))

Preparation of 4-((R)-3-ethyl-1-methylpentyloxycarbonyl)phenyl-4'-((R)-3-ethyl-1-methylpentyloxycarbonyl)-4-biphenylcarboxylate (1) Synthesis of 4-acetoxybenzoyl chloride 100 Grams (0.555 mol) of 4-acetoxybenzoic acid was added to 400 g (3.36 mol) of thionyl chloride, and the mixture was refluxed under heat for 4 hours.

Then, excess thionyl chloride was distilled off, and then the remainder was purified by distillation under reduced pressure (4 mmHg, 116° C.), to give 99 g (0.498 mol. yield 90%) of an end compound.

(2) Synthesis of (R)-4-acetoxy-1-(3-ethyl-1-methylpentyloxycarbonyl)benzene

49 Grams (0.246 mol) of 4-acetoxybenzoyl chloride, 29 g (0.222 mol) of (R)-4-ethyl-2-hexanol and 750 ml of dehydrated toluene were placed in a reactor, 35 g (0.442 mol) of pyridine was dropwise added thereto, and the mixture was stirred at room temperature for 15 hours.

To the reaction solution was added 300 ml of water, and the mixture was stirred at room temperature for 1 hour, followed by separating of the reaction mixture into two organic layers of liquid. The obtained organic layer was washed with 2N hydrochloric acid, washed with a 1N sodium hydroxide aqueous solution and then washed with water. The washed organic layer was dried over anhydrous sodium sulfate and filtered, and the solvent was removed from the filtrate by distillation, to give 63 g (0.215 mol. yield 97%) of an end compound.

(3) Synthesis of (R)-4-hydroxy-1-(3-ethyl-1-methylpentyloxycarbonyl)benzene

63 Grams (0.215 mol) of (R)-4-acetoxy-1-(3-ethyl-1-methylpentyloxycarbonyl)benzene was dissolved in 900 ml of dehydrated toluene, 25 g of a solution of 40% methylamine in methanol was dropwise added, and the mixture was stirred at room temperature for 5 hours. The reaction mixture was washed with 2N hydrochloric acid and washed with water. The resultant organic layer was dried over anhydrous sodium sulfate and filtered, and then the solvent was distilled off, to give 49 g (0.195 moll yield 91%) of an end compound.

(4) Synthesis of 4-((R)-3-ethyl-1-methylpentyloxycarbonyl)phenyl-4'-((R)-3-ethyl-1-methylpentyloxycarbonyl)-4-biphenylcarboxylate 3.1 Grams (12.3 mmol) of (R)-4-hydroxy-1-(3-ethyl-1-methylpentyloxycarbonyl)benzene, 3.1 g (11.1 mmol) of 4,4'-biphenyldicarbonyl chloride and 100 ml of dehydrated dichloromethane were placed in a reactor, 4 g (48 mmol) of pyridine was dropwise added, and the mixture was stirred at room temperature for 6 hours. Further, 1.5 Grams (11.5 mmol) of (R)-4-ethyl-2-hexanol was added, and the mixture was stirred at room temperature for 18 hours. To the reaction solution was added 50 ml of water, and the mixture was stirred at room temperature for 2 hours. Then, a liquid of an organic layer was separated. The organic layer was washed with 2N hydrochloric acid, washed with a 1N sodium hydroxide aqueous solution and then washed with water, the washed organic layer was dried over anhydrous sodium sulfate and filtered, and then the solvent was distilled off. The thus-obtained crude product was purified by silica gel chromatography, to give 2.0 g (3.40 mmol, yield 30%) of an end compound.

Example 5

(Formula (1): X is H, Y is F, A is —Ph—Ph—COO—, and R is $(C_2H_5)_2CHCH_2C^*H(CH_3)$— (E5))

Preparation of 3-fluoro-4-((R)-3-ethyl-1-methylpentyloxycarbonyl)phenyl-4'-((R)-3-ethyl-1-methylpentyloxycarbonyl)-4-biphenylcarboxylate An end compound was obtained in the same manner as in Example 4 except that 4-acetoxybenzoic acid in (1) of Example 4 was replaced with 4-acetoxy-2-fluorobenzoic acid (0.555 mol).

Example 6

(Formula (1): Each of X and Y is H, A is —Ph—Ph—COO— and R is Ph—C*H(CH$_3$)— (E6))

Preparation of 4-((R)-α-methylbenzyloxycarbonyl)phenyl-4'-((R)-3-ethyl-1-methylpentyloxycarbonyl)-4-biphenylcarboxylate 2.02 Grams (16.5 mmol) of (R)-phenylethanol, 3.75 g (15 nmol) of 4,4'-biphenyldicarbonyl chloride and 100 ml of dehydrated dichloromethane were placed in a reactor, 3.6 g (45 mmol) of pyridine was dropwise added, and the mixture was stirred at room temperature for 6 hours. Further, 4.6 g (16.5 mmol) of (R)-4-hydroxy-1-(3-ethyl-1-methylpentyloxycarbonyl)benzene obtained in the same manner as in (3) of Example 4 was added thereto, 3.6 g (45 mmol) of pyridine was dropwise added, and the mixture was stirred at room temperature for 48 hours. To the reaction solution was added 50 ml of water, the mixture was stirred at room temperature for 2 hours, and then a liquid of an organic layer was separated. The organic layer was washed with 2N hydrochloric acid, washed with a 1N sodium hydroxide aqueous solution and then washed with water, the washed organic layer was dried over anhydrous sodium sulfate and filtered, and then the solvent was distilled off. The thus-obtained crude product was purified by silica gel chromatography, to give 1.6 g (2.7 mmol, yield 17%) of an end compound.

Example 7

(Formula (1): Each of X and Y is H, A is —Ph—OOC—Ph—COO— and R is $(C_2H_5)_2CHCH_2C^*H(CH_3)$— (E7))

Preparation of 1,4-di-[4-((R)-3-ethyl-1-methylpentyloxycarbonyl)phenyldxycarbonyl]benzene 3.0 Grams (11.9 mmol) of (R)-4-hydroxy-1-(3-ethyl-1-methylpentyloxycarbonyl)benzene obtained in the same manner as in (3) of Example 4, 1.0 g (4.92 mmol) of terephthaloyl dichloride and 50 ml of dehydrated toluene were placed in a reactor, 2 g (24 mmol) of pyridine was dropwise added, and the mixture was stirred at room temperature for 15 hours. To the reaction solution was added 30 ml of water, the mixture was stirred at room temperature for 2 hours, and a liquid of an organic layer was separated. The organic layer was washed with 2N hydrochloric acid, washed with a 1N sodium hydroxide aqueous solution and then washed with water, the washed organic layer was dried over anhydrous sodium sulfate and filtered, and then the solvent was distilled off. The thus-obtained crude product was purified by silica gel chromatography, to give 2.2 g (3.48 mmol, yield 70%) of an end compound.

Example 8

(Formula (1): X is H, Y is F, A is —Ph(F)—OOC—Ph—COO—, and R is $(C_2H_5)_2CHCH_2C^*H(CH_3)$— (E8))

Preparation of 1,4-di-[3-fluoro-4-((R)-3-ethyl-1-methylpentyloxycarbonyl)phenyloxycarbonyl]benzene An end compound was obtained in the same manner as in Example 7 except that (R)-4-hydroxy-1-(3-ethyl-1-methylpentyloxycarbonyl)benzene was replaced with (R)-4-hydroxy-2-fluoro-1-(3-ethyl-1-methylpentyloxycarbonyl)benzene (11.9 mmol).

Example 9

(Formula (1): Each of X and Y is H, A is —Ph—OOC—Np—COO—, and R is $(C_2H_5)_2CHCH_2C^*H(CH_3)$— (E9))

Preparation of 2,6-di-[4-((R)-3-ethyl-1-methylpentyloxycarbonyl)phenyloxycarbonyl]naphthalene 2.6 Grams (10.3 mmol) of (R)-4-hydroxy-1-(3-ethyl-1-methylpentyloxycarbonyl)benzene obtained in the same manner as in (3) of Example 4, 1.0 g (4.92 mmol) of 2,6-naphthalenedicarboxylic acid and 50 ml of dehydrated dichloromethane were placed in a reactor, 2.3 g (11.1 mmol) of dicyclohexylcarbodiimide and 0.26 g (2.1 mmol) of 4-dimethylaminopyridine were added, and the mixture was stirred at room temperature for 24 hours. To the reaction solution was added 20 ml of water, and the mixture was stirred at room temperature for 1 hour. Then, the reaction mixture was filtered with Celite, and diethyl ether was added to separate a liquid of an organic layer. The organic layer was washed with 2N hydrochloric acid, washed with a 1N sodium hydroxide aqueous solution and then washed with water. The washed organic layer was dried over anhydrous sodium sulfate and filtered, and the solvent was distilled off. The thus-obtained crude product was purified by silica gel chromatography, to give 2.0 g (2.93 mmol, yield 59%) of an end compound.

Example 10

(Formula (1): Each of X and Y is H, A is —Ph—OOC—Cy—COO—, and R is $(C_2H_5)_2CHCH_2C^*H(CH_3)$— (E10))

Preparation of 1,4-trans-di-[4-((R)-3-ethyl-1methylpentyloxycarbonyl)phenyloxycarbonyl]cyclohexane An end compound was obtained in the same manner as in Example 9 except that 2,6-naphthalenedicarboxylic acid was replaced with 1,4-trans-cyclohexyldicarboxylic acid (4.92 mmol).

Example 11

(Formula (1): Each of X and Y is H, A is —Np—OOC—, and R is Ph—$C^*H(CH_3)$— (E11))

Preparation of 6-((R)-α-methylbenzyloxycarbonyl)naphthyl-2-((R)-3-ethyl-1-methylpentyloxycarbonyl)benzoate (1) Synthesis of 6-acetoxy-2-naphthoic acid 25 Grams (133 mmol) of 6-hydroxy-2-naphthoic acid and 68 g (265 mmol) of acetic anhydride were placed in a reactor, and while the mixture was stirred, 0.05 g of concentrated sulfuric acid was added. The mixture was stirred until heat generation ceased, and the mixture was further heated and stirred at 80° C. for 1 hour and then gradually cooled to room temperature. While the reaction mixture was cooled in an ice bath, 500 g of water was gradually added, and the mixture was stirred at room temperature for 3 hours to quench unreacted acetic anhydride. A precipitated white solid was recovered by filtration, washed with water to remove acetic acid, and dried with a vacuum dryer, to give 30.3 g of an end compound (yield 99%)

(2) Synthesis of 6-acetoxy-2-naphthoyl chloride

30 Grams (130.3 mmol) of 6-acetoxy-2-naphthoic acid and 155 g (260 mmol) of purified thionyl chloride were placed in a reactor, and the mixture was refluxed under heat (79° C.) for 4 hours. Thionyl chloride was distilled off under atmospheric pressure, 150 ml of toluene was added, and toluene and thionyl chloride were distilled off under reduced pressure, to give 33 g of an end compound (yield 98%).

(3) Synthesis of (R)-α-methylbenzyl-6-acetoxynaphthyl-2-carboxylate 11.2 Grams (45 mmol) of 6-acetoxy-2-naphthoyl chloride, 5.0 g (45 mmol) of (R)-phenylethanol and 88 ml of toluene were placed in a reactor, 6.5 g (90 mmol) of pyridine was dropwise added thereto, and the mixture was stirred at room temperature for 3 hours. To the reaction solution was added 20 ml of water, the mixture was stirred at room temperature for 30 minutes, and then a liquid of an organic layer was separated. The organic layer was washed with 2N hydrochloric acid, washed with a 1N sodium hydroxide aqueous solution and then washed with water. The washed organic layer was dried over anhydrous sodium sulfate and filtered, and the solvent was distilled off, to give 10.7 g of an end compound (yield 78%).

(4) Synthesis of (R)-α-methylbenzyl-6-hydroxynaphthyl-2-carboxylate 10.7 Grams (32.2 mmol) of (R)-α-methylbenzyl-6-acetoxynaphthyl-2-carboxylate and 185 ml of toluene were placed in a reactor, a solution of 40% methylamine in methanol was dropwise added thereto, and the mixture was stirred at room temperature for 3 hours. The reaction solution was washed with 2N hydrochloric acid and water to separate the mixture to two layers of liquid. The organic layer was dried over anhydrous sodium sulfate and filtered, and then the solvent was distilled off, to give 8.9 g of an end compound (yield 95%).

(5) Synthesis of 6-((R)-α-methylbenzyloxycarbonyl)naphthyl-2-((R)-3-ethyl-1-methylpentyloxycarbonyl)benzoate 3.0 Grams (10.3 mmol) of (R)-α-methylbenzyl-6-hydroxynaphthyl-2-carboxylate, 2.5 g (20.5 mmol) of terephthaloyl dichloride and 104 ml of toluene were placed in a reactor, 1.6 g (20.5 mmol) of pyridine was dropwise added thereto, and the mixture was stirred at room temperature for 24 hours. Further, 1.87 g (14.4 mmol) of (R)-4-ethyl-2-hexanol and 1.6 g (20.5 mmol) of pyridine were added, and the mixture was stirred at room temperature for 24 hours. To the reaction solution was added 30 ml of water, the mixture was stirred at room temperature for 30 minutes, and a liquid of an organic layer was separated. The organic layer was washed with 2N hydrochloric acid, washed with a 1N sodium hydroxide aqueous solution and then washed with water, and dried over anhydrous sodium sulfate. The organic layer was filtered and then the solvent was distilled off. The thus-obtained crude product was purified by silica gel chromatography, to give 2.8 g (5 mmol, yield 48%) of an end compound.

With regard to the optically active compounds (E1 to E11) obtained in the above Examples 1 to 11, results of $^1$H-NMR thereof are shown in Tables 1 and 2, and a common portion in the general formula, R portions in the general formula and A portions in the general formula are respectively shown below.

Further, phase transition temperatures of the optically active compounds (E1 to E11) were determined by observation through a polarizing microscope and DSC measurement. The DSC measurement was conducted at a temperature decrease rate of 5° C./minute. Table 3 shows the results.

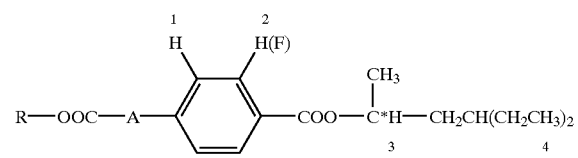

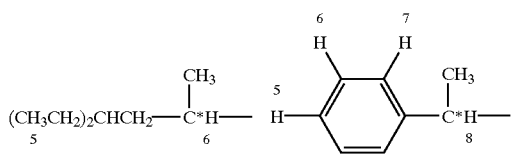

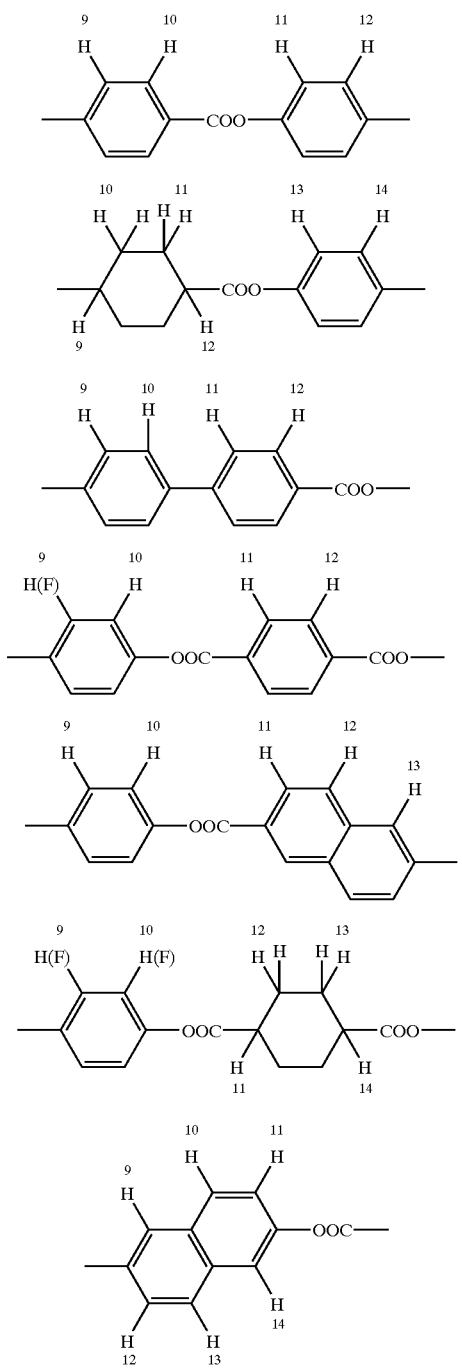

TABLE 1

| | Common portion in formula (1) | | | | | | | |
|---|---|---|---|---|---|---|---|---|
| | Benzene ring | Asymmetric carbon | | Terminal methyl | R portion in formula (1) | | | |
| No. | 1 | 2 | 3 | 4 | 5 | 6 | 7 | 8 |
| E1 | 7.68 | 8.12 | 5.28 | 0.88 | 0.88 | 5.28 | — | — |
| E2 | 7.68 | 8.11 | 5.27 | 0.88 | 7.33 | 7.40 | 7.48 | 6.17 |
| E3 | 7.62 | 8.10 | 5.26 | 0.87 | 7.30 | 7.35 | 7.35 | 5.89 |
| E4 | 7.31 | 8.14 | 5.27 | 0.88 | 0.88 | 5.27 | — | — |

TABLE 1-continued

| | Common portion in formula (1) | | | | | | | |
|---|---|---|---|---|---|---|---|---|
| | Benzene ring | Asymmetric carbon | | Terminal methyl | R portion in formula (1) | | | |
| No. | 1 | 2 | 3 | 4 | 5 | 6 | 7 | 8 |
| E5 | 7.13 | — | 5.27 | 0.89 | 0.89 | 5.27 | — | — |
| E6 | 7.31 | 8.29 | 5.26 | 0.87 | 7.39 | 7.31 | 7.47 | 6.17 |
| E7 | 7.33 | 8.14 | 5.26 | 0.88 | O.88 | 5.26 | — | — |
| E8 | 7.14 | — | 5.27 | 0.88 | 0.88 | 5.27 | — | — |
| E9 | 7.36 | 8.20 | 5.27 | 0.88 | 0.88 | 5.27 | — | — |
| E10 | 7.25 | 8.07 | 5.23 | 0.86 | 0.86 | 5.23 | — | — |
| E11 | 8.31 | 8.19 | 5.29 | 0.88 | 7.25 | 7.32 | 7.50 | 6.21 |

TABLE 2

| | A portion in formula (1) | | | | | |
|---|---|---|---|---|---|---|
| No. | 9 | 10 | 11 | 12 | 13 | 14 |
| E1 | 8.28 | 8.19 | 7.33 | 7.68 | — | — |
| E2 | 8.25 | 8.25 | 7.33 | 7.68 | — | — |
| E3 | 2.38 | |←2.15 ~ 2.24→| | | 2.55 | 7.16 | 7.62 |
| E4 | 8.14 | 7.75 | 7.75 | 8.29 | — | — |
| E5 | 8.15 | 7.22 | 7.77 | 8.03 | — | — |
| E6 | 8.19 | 7.74 | 7.74 | 8.14 | — | — |
| E7 | 8.14 | 7.33 | 8.35 | 8.35 | — | — |
| E8 | — | 7.14 | 8.34 | 8.34 | — | — |
| E9 | 8.20 | 7.36 | 8.20 | 8.20 | 8.87 | — |
| E10 | 8.07 | 7.25 | 2.62 | |←1.72 ~ 2.30→| | | 2.62 |
| E11 | 8.67 | 7.88 | 7.41 | 8.14 | 8.04 | 7.76 |

TABLE 3

| Compound | Phase sequence |
|---|---|
| E1 | Iso (−40° C. or lower) Cry |
| E2 | Iso (−40° C. or lower) Cry |
| E3 | Iso (35) Cry |
| E4 | Iso (35) Cry |
| E5 | Iso (12) Cry |
| E6 | Iso (−40° C. or lower) Cry |
| E7 | Iso (−40° C. or lower) Cry |
| E8 | Iso (36) Cry |
| E9 | Iso (59) Cry |
| E10 | Iso (44) Cry |
| E11 | Iso (−40° C. or lower) Cry |

Notes)
In Table, parenthesized values show phase transition temperatures (° C.), Iso stands for an isotropic phase, and Cry stands for a crystal phase.

Example 12

The optically active compounds (E1 to E11) prepared above were measured for helical twisting powers (HTP) and wavelength shifts. To a nematic liquid crystal (ZLI-1565) supplied by Merck & Co., Inc., was added 10% by weight, based on a resultant composition, of the optically active compound (E1) obtained from Example 1 to prepare a chiral nematic (N*) liquid crystal composition. The thus-prepared liquid crystal composition was measured for an upper limit temperature of its N* phase and selective reflection behaviors, and its helical twisting power (HTP) was determined on the basis of the selective reflection behaviors.

The upper-limit temperature of the N* phase was determined by observation through a polarizing microscope and DSC measurement. The selective reflection behaviors were measured according to the following procedures.

A liquid crystal cell with ITO electrodes (cell thickness 10 μm) was charged with the above liquid crystal composition in an isotropic state. The cell was adjusted to 60° C., a rectangular wave voltage of ±60 V was applied for approximately 1 minute, and the cell was rapidly cooled to room temperature to attain planar alignment. The above liquid crystal cell was evaluated for selective reflection behaviors at 25° C. and 60° C. with an automatic spectrophotometer. An HTP at 25° C. was calculated on the basis of the following expressions.

$$\text{HTP } (\mu m^{-1}) = n/(\lambda_{25} \times C/100)$$

wherein n is a refractive index of the chiral nematic liquid crystal, $\lambda_{25}$ is a selective reflection wavelength ($\mu m$) at 25° C., and C is a concentration (wt %) of the chiral dopant. As a refractive index n, there was employed a value (1.6) that is the refractive index of ZLI-1565 as a base liquid crystal.

The wavelength shift was determined on the basis of the following expression.

$$\text{Wavelength shift } (nm) = \lambda_{60} - \lambda_{25}$$

wherein $\lambda_{60}$ is a selective reflection wavelength (nm) at 60° C. and $\lambda_{25}$ is a selective reflection wavelength (nm) at 25° C. Table 4 summarizes the results.

It is seen that the optically active compound (E1) in Example 1 has an HTP of more than 14 and further has the property that the helix decreases in length with an increase in temperature.

Examples 13 to 22

The optically active compounds (E2 to E11) obtained in Examples 2 to 11 were measured for HTPs and wavelength shifts in the same manner as in Example 12. Incidentally, with regard to the compounds E10 and E11, 15% by weight, based on a nematic liquid crystal composition, of each was added, and the compositions were measured. Further, since liquid crystal compositions containing E10 and E11 exhibited no selective reflection at 60° C., wavelength shifts (*1) between 25° C. and 50° C. were determined. Table 4 shows the results.

Comparative Examples 1 to 3

With regard to known optically active compounds CB15, S811 and CN shown in the explanation of Prior Art, nematic liquid crystal compositions were prepared in the same manner as in Example 12 except that CB15 and S811 were added in an amount of 15% by weight based on the nematic liquid crystal composition each, and that CN was added in an amount of 30% by weight based on the nematic liquid crystal composition, and the nematic liquid crystal compositions were measured for HTPs and wavelength shifts in the same manner as in Example 12. Table 4 also shows the results.

TABLE 4

| Example | Compound | Iso-N* (° C.) | HTP (1/μm) | Wavelength shift (nm) |
|---|---|---|---|---|
| 12 | E1 | 79 | 17.1 | −101 |
| 13 | E2 | 81 | 23.4 | −81 |
| 14 | E3 | 80 | 21.7 | −59 |
| 15 | E4 | 80 | 18.1 | −72 |
| 16 | E5 | 80 | 15.7 | −93 |
| 17 | E6 | 80 | 22.2 | −59 |
| 18 | E7 | 81 | 17.3 | −78 |
| 19 | E8 | 81 | 14.6 | −78 |

TABLE 4-continued

| Example | Compound | Iso-N* (° C.) | HTP (1/μm) | Wavelength shift (nm) |
|---|---|---|---|---|
| 20 | E9 | 84 | 16.1 | −136 |
| 21 | E10 | 73 | 17.6 | −43 (*1) |
| 22 | E11 | 70 | 22.7 | −10 (*1) |
| C. Ex. 1 | CB15 | 74 | 7.9 | +193 |
| C. Ex. 2 | S811 | 73 | 10.1 | +7 |
| C. Ex. 3 | CN | 82 | 5.2 | +34 |

Notes)
In the table, C. Ex. = Comparative Example, and Iso-N* stands for a temperature of phase transition from an isotropic phase to a chiral nematic phase. (1*) shows that values are wavelength shifts between 25° C. and 50° C.

What is claimed is:

1. An optically active compound of the following general formula (1),

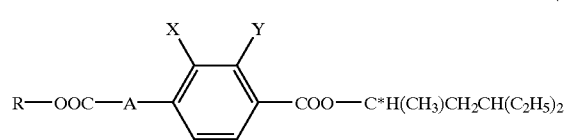

(1)

wherein each of X and Y is independently a hydrogen atom or a fluorine atom, R is $(C_2H_5)_2CHCH_2C^*H(CH_3)$— or Ph—C*H(CH$_3$)—, A is —Ph(W)—COO—Ph—, —Ph—Ph—COO—, —Cy—COO—Ph—, —Ph(W)—OCC—Ph—COO—, —Ph(W)—OOC—Cy—COO—, —Ph(W)—OOC—Np—COO— or —Np—OOC—, in which Ph— is a phenyl group, —Ph— is a 1,4-phenylene group, —Ph(W)— is —Ph— or monofluoro substituted —Ph—, Cy— is a trans-1,4-cyclohexylene group and —Np— is a 2,6-naphthylene group, and C* is an asymmetric carbon.

2. The optically active compound of claim 1, which has the general formula (1) wherein X and Y are hydrogen atoms.

3. The optically active compound of claim 1, which has the general formula (1) wherein —Ph(W)— is —Ph—.

4. The optically active compound of claim 1, which has the general formula (1) wherein A is —Ph(W)—COO—Ph—.

5. The optically active compound of claim 1, wherein the compound of the general formula (1) is the following compound,

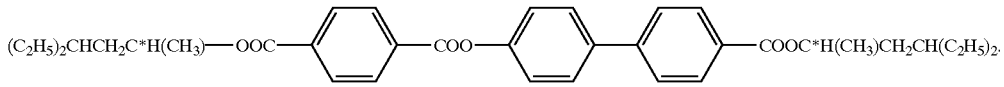

6. The optically active compound of claim 1, wherein the compound of general formula (1) is the following compound,

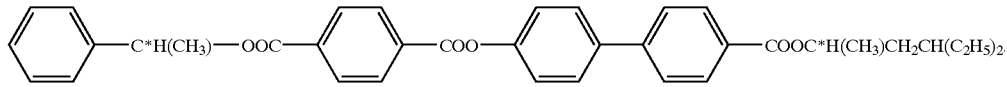

7. The optically active compound of claim 1, which has the general formula (1) wherein two asymmetric carbon atoms are R-configuration compounds together, or both S-configuration compounds together.

8. The optically active compound of claim 1, which has a helical twisting power (HTP) of at least 14.

9. The optically active compound of claim 1, which is characterized in that a helical pitch induced decreases in length with an increase in temperature.

10. A nematic liquid crystal composition containing at least one of optically active compounds of the general formula (1)

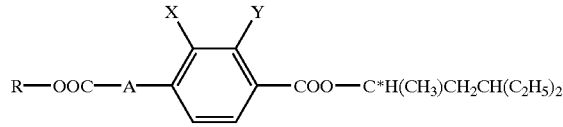

wherein each of X and Y is independently a hydrogen atom or a fluorine atom, R is $(C_2H_5)_2CHCH_2C^*(CH_3)$— or Ph—C*(CH$_3$)—, A is —Ph(W)—COO—Ph—, —Ph—Ph—COO—, —Cy—COO—Ph—, —Ph(W)—OOC—Ph—COO—, —Ph(W)—OOC—Cy—COO—, —Ph(W)—OOC—Np—COO— or —Np—OOC—, in which Ph— is a phenyl group, —Ph— is a 1,4-phenylene group, —Ph(W)— is —Ph— or monofluoro substituted —Ph—, Cy— is a trans-1,4-cyclohexylene group and —Np— is a 2,6-naphthylene group, and C* is an asymmetric carbon.

11. A liquid crystal display device having the nematic liquid crystal composition recited in claim 10 interposed between substrates having an electrode each.

\* \* \* \* \*